United States Patent
Cami

(10) Patent No.: US 8,804,003 B2
(45) Date of Patent: Aug. 12, 2014

(54) FLICKER DETECTION FOR IMAGING DEVICES WITH HIGH FRAME RATES

(75) Inventor: Sergi Cami, Thacham (GB)

(73) Assignee: Aptina Imaging Corporation, George Town (KY)

( * ) Notice: Subject to any disclaimer, the term of this patent is extended or adjusted under 35 U.S.C. 154(b) by 590 days.

(21) Appl. No.: 13/104,871

(22) Filed: May 10, 2011

(65) Prior Publication Data

US 2012/0194698 A1   Aug. 2, 2012

Related U.S. Application Data

(60) Provisional application No. 61/437,274, filed on Jan. 28, 2011, provisional application No. 61/470,426, filed on Mar. 31, 2011.

(51) Int. Cl.
  H04N 9/73    (2006.01)
  H04N 3/14    (2006.01)

(52) U.S. Cl.
  USPC ................................. 348/226.1; 348/294

(58) Field of Classification Search
  USPC ................. 348/226.1, 228.1, 223.1, 294
  See application file for complete search history.

(56) References Cited

U.S. PATENT DOCUMENTS

| | | | |
|---|---|---|---|
| 6,630,953 B1 | 10/2003 | Toyoda et al. | |
| 7,242,432 B2 * | 7/2007 | Watanabe | 348/333.11 |
| 7,471,316 B2 | 12/2008 | Takahashi et al. | |
| 7,580,071 B2 * | 8/2009 | Uchiyama | 348/251 |
| 7,633,533 B2 | 12/2009 | Cho et al. | |
| 7,750,949 B2 | 7/2010 | Poplin et al. | |
| 7,764,312 B2 | 7/2010 | Ono et al. | |
| 2006/0158531 A1 * | 7/2006 | Yanof | 348/226.1 |
| 2006/0232686 A1 * | 10/2006 | Ono et al. | 348/226.1 |
| 2007/0153094 A1 * | 7/2007 | Noyes et al. | 348/226.1 |
| 2007/0182831 A1 * | 8/2007 | Katoh et al. | 348/226.1 |
| 2011/0141230 A1 * | 6/2011 | Bai | 348/43 |

FOREIGN PATENT DOCUMENTS

WO    2010054484    5/2010

* cited by examiner

*Primary Examiner* — Trung Diep
(74) *Attorney, Agent, or Firm* — Treyz Law Group; Louis R. Levenson; Michael H. Lyons

(57) ABSTRACT

Common electronic devices having imaging systems that use a rolling shutter scheme suffer from flicker due to the oscillating brightness of an illuminating light source. Some imaging systems use fast frame rates that result in less than two cycles of the illuminating light source occurring during a single frame capture. For devices that employ rolling shutter schemes and fast frame rates, a method of data collection and processing is provided that utilizes a combination of multiple sets of more than two image data frames to automatically detect flicker. Measured patterns of energy differences between various image frames and a reference image frame may be compared with an expected pattern of energy differences to determine a probability of flicker detection due to a given flicker frequency. This probability of flicker detection may be used to activate flicker avoidance procedures in an electronic device.

21 Claims, 8 Drawing Sheets

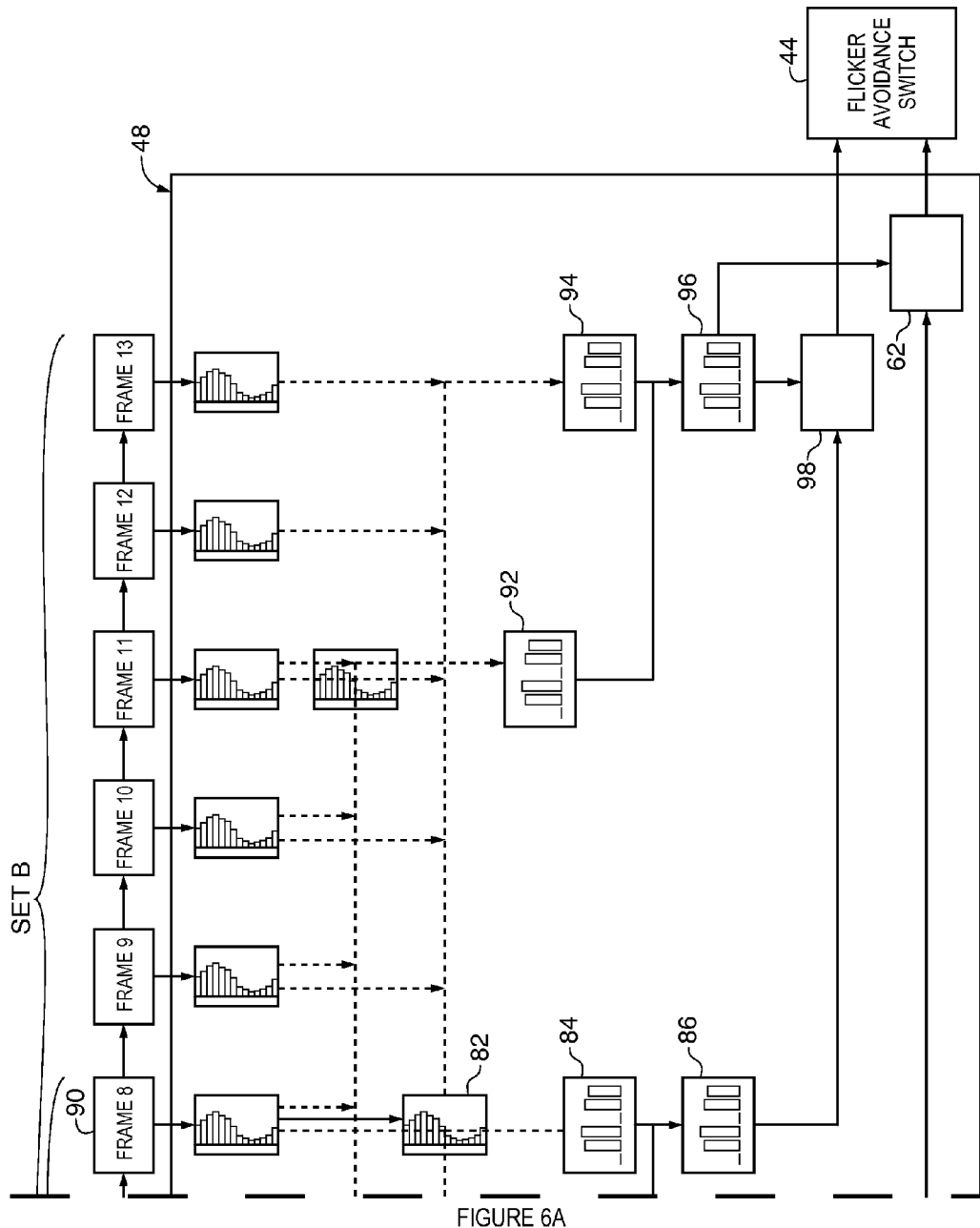

FLICKER DETECTION FOR IMAGING DEVICES WITH HIGH FRAME RATES

This application claims the benefit of provisional patent application No. 61/437,274, filed Jan. 28, 2011, and No. 61/470,426, filed Mar. 31, 2011 and which are hereby incorporated by reference herein in its entirety.

BACKGROUND

The present invention relates to imaging devices, and more particularly, to methods imaging devices capable of detecting flicker.

Image sensors are commonly used in electronic devices such as cellular telephones, cameras, and computers to capture images. In a typical arrangement, an electronic device is provided with an array of complementary metal-oxide semiconductor (CMOS) image sensors which includes individual CMOS image pixels arranged in rows and columns. Imaging devices often use a rolling shutter scheme in which the image pixels reset on a row-by-row basis (i.e., each row of image pixels captures image data a different times).

Imaging devices can be operated outdoors and indoors. Indoor light sources are commonly powered by an alternating current (AC) power supply cycling at a frequency of 50 Hz or 60 Hz. As a result, light sources powered using an AC power supply may exhibit a flicker at a flicker frequency (FF) that is double the AC frequency of the power source, i.e., 100 Hz or 120 Hz.

A rolling-shutter-based imaging device may therefore generate a captured image having bright and dark portions because of fluctuations in the light source (i.e., the captured image is said to exhibit flicker). In cases where multiple images are obtained and displayed, such as in a video device or a continuous digital camera finder display, flicker may be apparent. In conventional imaging systems, flicker is reduced by setting the integration time (sometimes called exposure time) of each pixel row to be a multiple of the flicker frequency. This method, however, requires prior knowledge of the flicker frequency.

It would be desirable to provide imaging devices capable of automatically detecting flicker and correcting the imaging process accordingly.

DETAILED DESCRIPTION

Image sensors are widely used in electronic devices such as digital cameras, computers, cellular telephones, and other electronic devices. These electronic devices may include image pixels (e.g., photosensitive devices used to gather incoming light to generate a captured image) arranged in an arrays or other suitable. A typical image pixel array may, for example, have hundreds of thousands or millions of pixels (e.g., megapixels). Conventional electronic devices may employ a rolling shutter scheme. In a rolling shutter scheme, data in each pixel is reset on a row-by-row basis. Data is also read out from each pixel on a row-by-row basis.

Rolling-shutter-based imaging devices may be used in environments with a variety of illumination conditions. For example, a device may be used outdoors in the presence of sunlight, or in a room lit by artificial light sources (e.g., incandescent, fluorescent, electroluminescent, or gas discharge lamps). These light sources are typically powered by an alternating electric current (AC) that alternates at a frequency of 50 Hz or 60 Hz, depending on geographical location (e.g., 50 Hz in European countries, 60 Hz in North American countries). Light sources powered by an alternating current that alternates at a frequency of 50 Hz will cycle at a double that frequency (i.e., 100 Hz), exhibiting a 100 Hz flicker frequency, resulting in a period of oscillation of 10 milliseconds.

If the exposure time (i.e., the amount of time an image pixel is allowed to gather incoming light) in the rolling shutter scheme is much longer than the period of oscillation of the illuminating light source, each pixel will be exposed to the same average illumination intensity. If, however, the exposure time in the rolling shutter scheme is similar to, or less than the period of oscillation of the illuminating light source a sinusoidal variation in brightness may appear in a captured image.

Flicker may be reduced by matching the exposure time of each pixel to a multiple of the oscillation period of the illuminating light source. Matching the exposure time to the period of illumination requires knowledge of the flicker frequency (FF) of the illuminating light source (i.e., the inverse of the oscillation period of the illuminating light source). This may be provided by the user or may be determined automatically by the imaging device.

Figure 1:
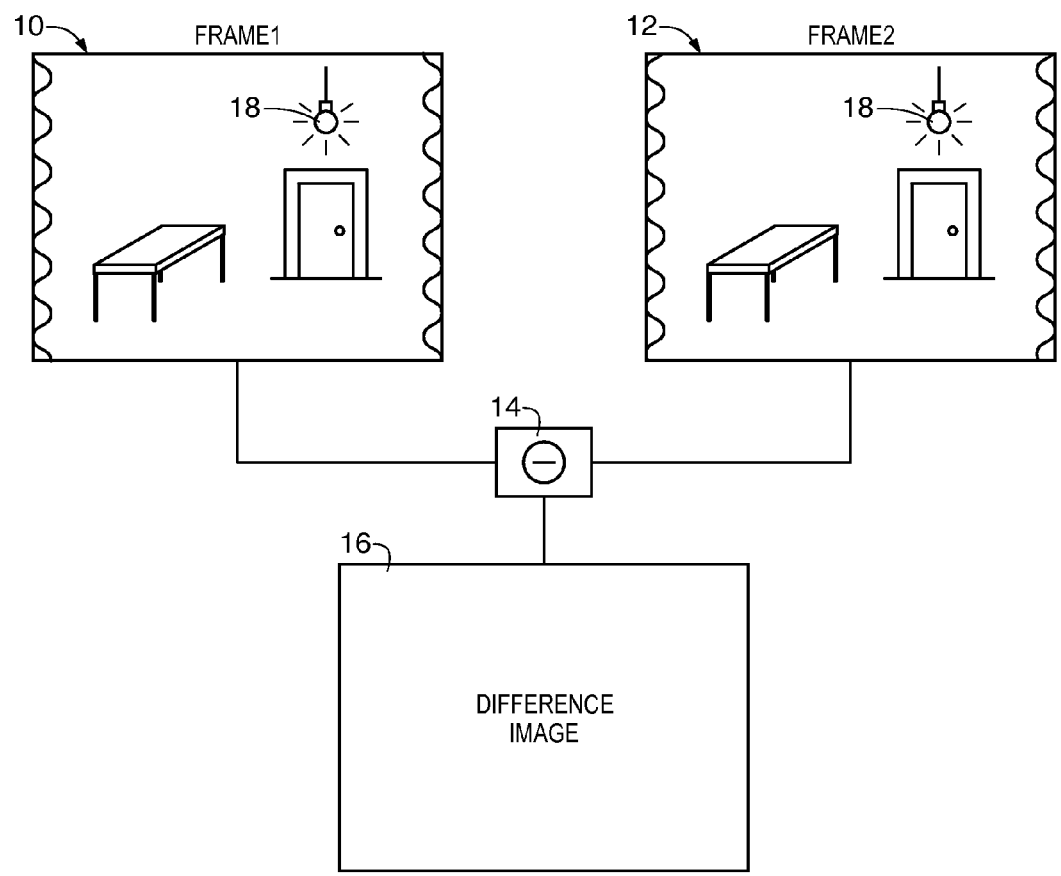
FIG. 1 is a diagram of conventional flicker detection.

FIG. 1 is a diagram of a conventional method of automatically determining flicker frequency. As shown in FIG. 1, a conventional device obtains a first frame 10 and a second frame 12 of the same real-world scene. First frame 10 and second frame 20 both exhibit a sinusoidal flicker pattern because the scene is illuminated using an AC powered light source such as light source 18. Processing circuitry 14 is used to subtract second frame 12 from first frame 10 to obtain difference image 16. This subtraction step removes the scene contents and reveals a characteristic pattern in difference image 16 which can be used to determine the flicker frequency.

The number of cycles NC of the sinusoidal flicker pattern in a given image frame is determined by the frame rate FR (i.e., the rate at which an image array is read out) and the flicker frequency FF of the illuminating source, as described in equation (1):

$$NC = FF/FR. \tag{1}$$

According to equation (1), for a given flicker frequency, number of cycles NC decreases as frame rate FR of the imaging device increases. A low number of cycles NC makes it difficult to determine flicker frequency from a single difference image 16. Typically, a minimum number of cycles NC equal to two may be necessary for reliable flicker frequency detection using the conventional differencing method of FIG. 1. Imaging devices having fast frame rates FR (e.g., frame rates greater than 50 frames per second) result in number of cycles NC less than 2. It would therefore be desirable to provide electronic devices with high frame rates capable of providing automatic flicker detection.

Figure 2:
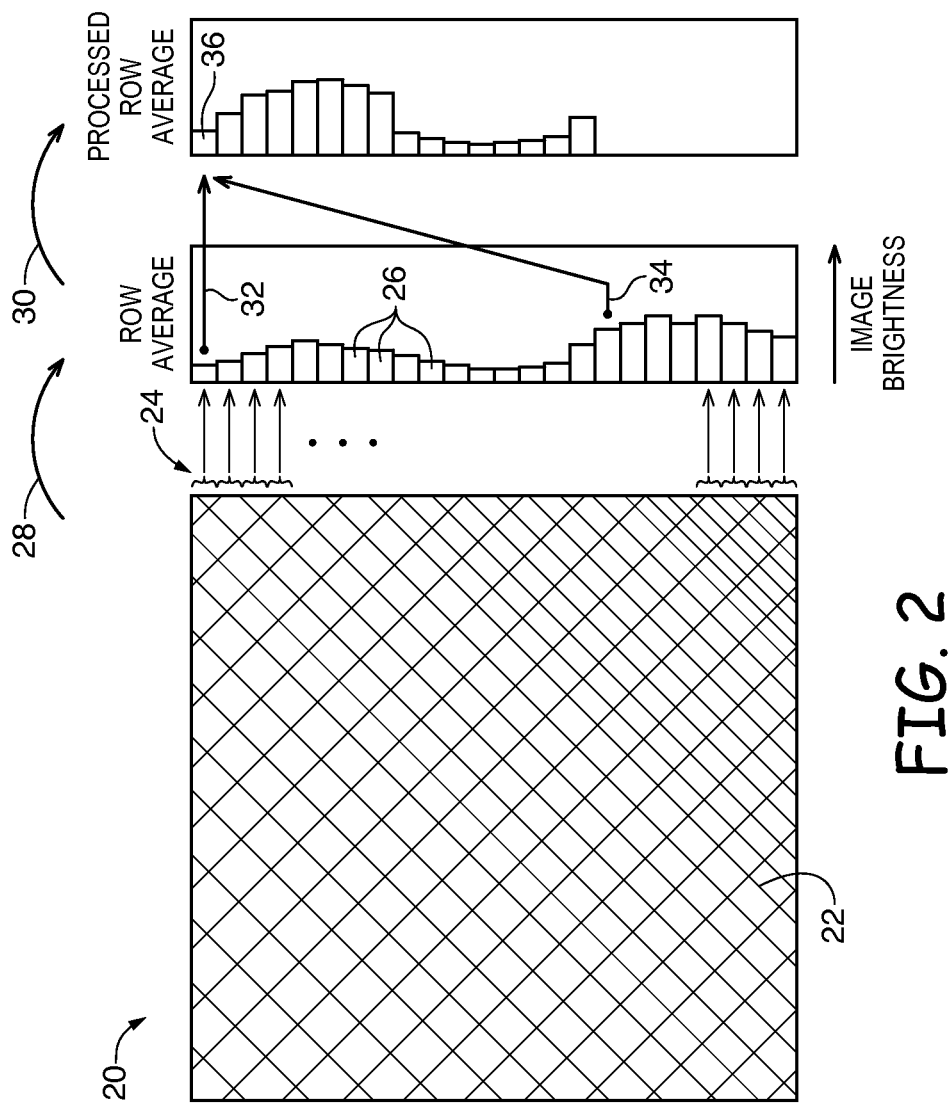
FIG. 2 is a diagram of an illustrative image exhibiting flicker captured using a rolling shutter scheme with a high frame rate.

FIG. 2 is a diagram of a single image frame 20 obtained at a high frame rate FR. High FR results in a number of cycles NC of the illuminating light source in frame 20 less than, e.g., two. Frame 20 may also represent a non-uniform real-world scene 22 (e.g., real-world scene 22 is brighter in the lower right corner of frame 20 than in the upper left corner of frame 20) which further complicates detection of flicker frequency. FIG. 2 shows a row averaging process 28 in which the image signal in a pixel-set 24 (e.g., a set containing multiple rows of pixels) in frame 20 may be averaged to determine row-average image brightnesses. FIG. 2 also displays a folding process 30 in which row average values 26 from repeating portions of the sinusoidal variation in frame 20 are further averaged. For example, row-average value 32 and row-average value 34 may both correspond to the beginning (e.g., zero phase) of consecutive cycles of an illuminating light source. In the illustrative example of FIG. 2, row-average value 34 is higher than row-average value 32 due to non-uniform real-world scene 22, which is also represented in frame 20 (i.e., row-average value 34 represents a brighter portion of real-world scene 22 than that represented by row-average value 32). At folding step 30, row-average value 32 and row-average value 34 may be averaged to generate a single processed row-average value 36. Folding process 30 may reduce memory consumption and simplify later computations involving row average values 26 (i.e., later computation may always be performed using a same number of processed row-average values 36).

Figure 3:
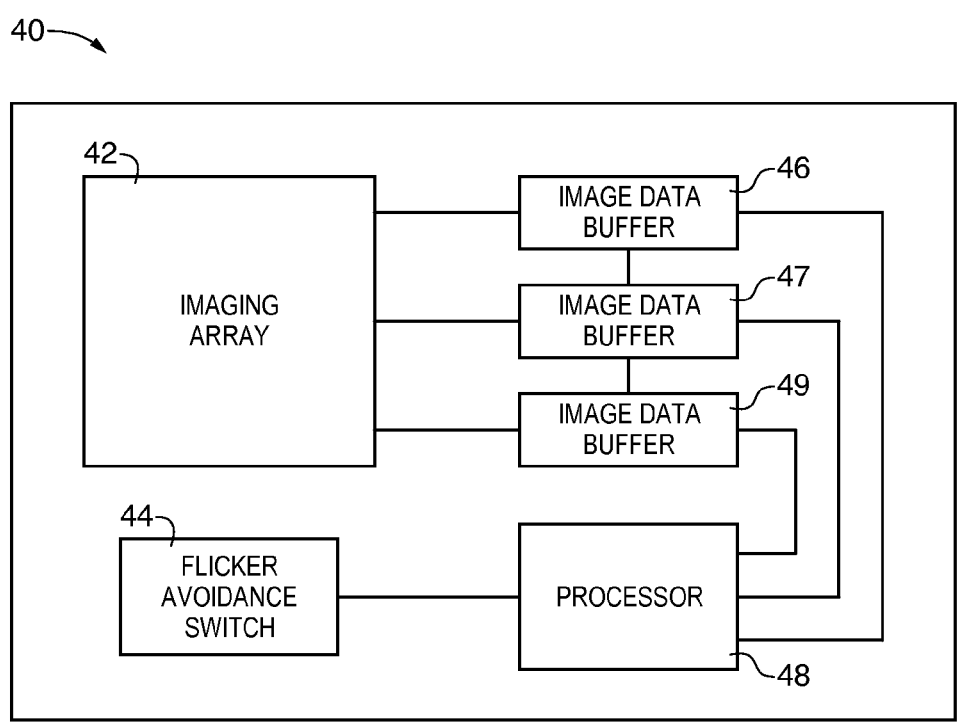
FIG. 3 is a diagram of an illustrative electronic device with automatic flicker detection capabilities in accordance with an embodiment of the present invention.

FIG. 3 is a diagram of an illustrative electronic device 40 capable of providing automatic flicker detection by comparing more than two image frames obtained with high frame rates. Device 40 may be a digital camera, computer, cellular telephone, or other electronic device. Device 40 may including an image pixel array 42 coupled to a plurality of image data buffers 46. Image data buffers 46 may provide image data to processor 48 for further processing. Processor 48 may output data to flicker avoidance switch 44. Flicker avoidance switch 44 may serve to initiate changes to the imaging process (e.g., changes to the exposure time for each image pixel, or other changes).

Figure 4:
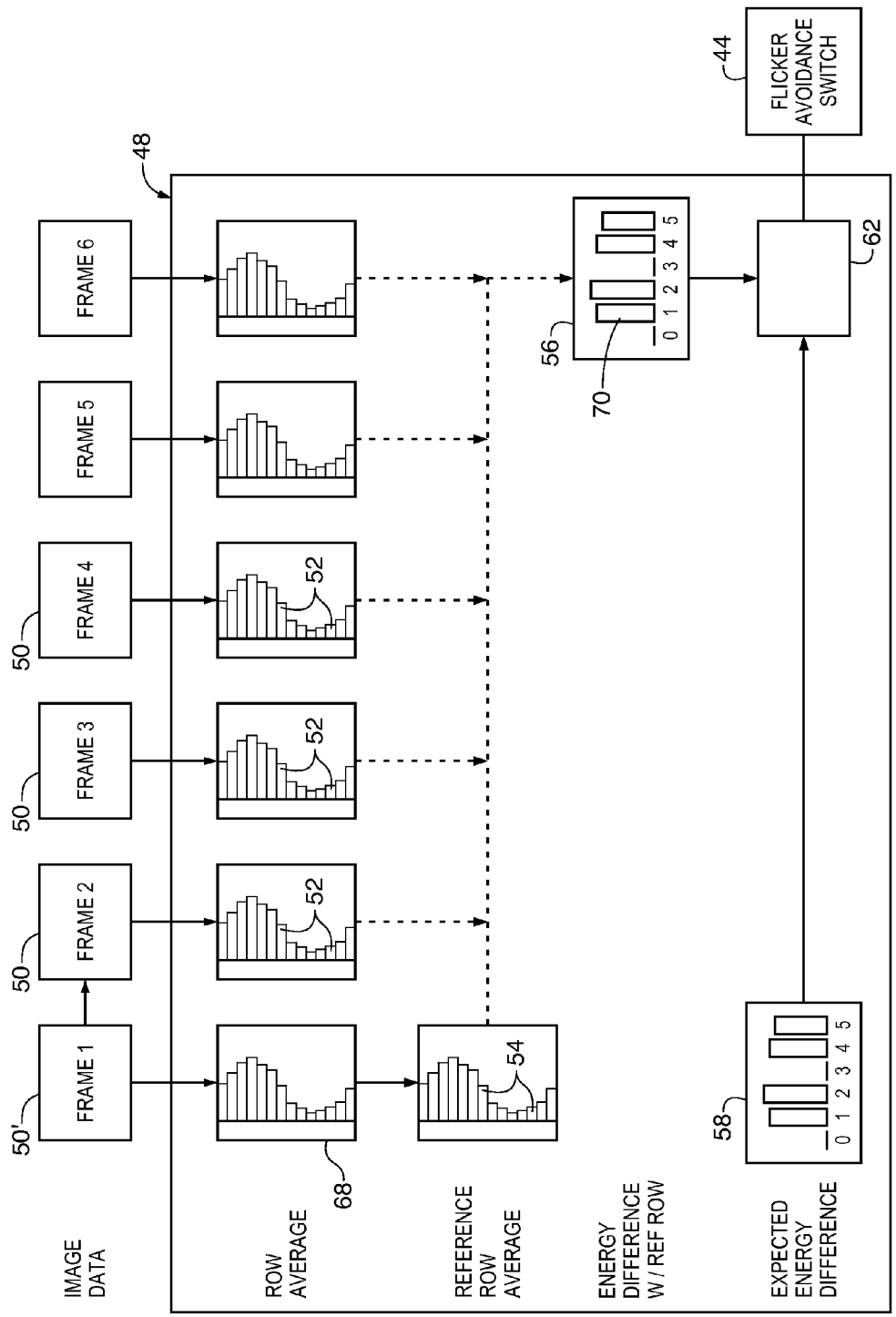
FIG. 4 is a diagram of an illustrative image data collection and processing method in accordance with an embodiment of the present invention.

FIG. 4 is a diagram of illustrative data collection and processing steps involved in providing flicker detection for devices 40 with fast frame rates in accordance with an embodiment of the present invention. As shown in FIG. 4, a plurality of image data frames may be obtained with image pixel array 42 of device 40 (see, e.g., FIG. 3). A first reference frame 50' may be stored in a first image data buffer 46. For first reference frame 50', row-average values 68 may be computed in the manner described in connection with FIG. 2. Row-average values 68 may be further processed by folding values associated with a second cycle of an illuminating light source onto values from a first cycle of an illuminating light source in the manner described in connection with FIG. 2, thereby generating reference row-average values 54.

Following computation and storage of reference row-average values 54, a subsequent image data frame 50 may be captured and stored in a second image data buffer 47. For subsequent image data frame 50, row-average values 52 may be computed. Row-average values 52 may then be combined with reference row-average values 54 to obtain a corresponding "energy difference" value 70 for subsequent image data frame 50. Energy difference values may be computed according to the following equation:

$$\text{Energy difference} = \Sigma([\text{reference row-average values} - \text{subsequent row-average values}]), \quad (2)$$

As shown in equation (2), energy difference can be determined by computing the sum of the squared differences between each subsequent row-averaged value 52 and reference row-average value 54. The energy difference calculation in equation (2) is merely illustrative and energy difference values 70 may be calculated in other ways (e.g., sum of absolute differences). Subsequent image data frames 50 may be captured and stored in the second image data buffer 47 (overwriting the previous image stored in second image buffer 47) and energy difference values 70 may be computed using equation (2) for a plurality of subsequent image data frames 50 as well as for the reference frame 50'. The energy difference value for reference frame 50' may be equal to zero (as an example).

Once energy difference values 70 have been computed for a predetermined number of image frames, the energy difference values 70 may be combined to form computed energy difference pattern 56. Device 40 may be provided with an expected energy difference pattern 58 associated with a given frame rate FR, exposure time, and illuminating light source frequency FF. Energy difference pattern 58 may also, if desired, be calculated using processor 48. Expected energy difference pattern 58 may be stored in permanent memory in device 40 or may be accessed via wired or wireless connection to a network. In the example of FIG. 4, a reference frame 50' and five subsequent image data frames 50 are used to compute energy difference pattern 56 (e.g., energy difference pattern 56 may include six energy difference values 70). This example is merely illustrative. Energy difference pattern 56 may include more than six values or less than six values, if desired.

Using processor 48 of device 40, current energy difference pattern 56 may then be compared with expected energy difference pattern 58 to compute correlation probability 62 (also referred to as flicker-detection probability). Flicker avoidance switch 44 may or may not be triggered depending on the value of flicker-detection probability 62. Device 40 may, for example, be provided with a predetermined correlation threshold of, e.g., 90%. If, for example, correlation probability 62 is less than the predetermined correlation threshold, flicker avoidance switch is not triggered. If, for example, flicker-detection probability 62 is greater than 90%, flicker avoidance switch 44 is triggered. Flicker avoidance switch 44 may be circuitry used to make an electronic switch or may be a software switch associated with processor 48.

Flicker-detection probability 62 may be computed using the following equation for general correlation probability CP between two exemplary sets of numbers S1 and S2, or using other suitable equations:

$$CP = ([S1_i - AVG(S1)] * [S2_i - AVG(S2)] / SQRT(\Sigma_i[(S1_i - AVG(S1))^2] * \Sigma_i[(S2_i - AVG(S2))^2]) \quad (3)$$

As shown in equation (3), each element of S1 and S2 are indexed by letter i. The symbol $\Sigma_i$ indicates that all elements, i, of S1 and/or S2 should be added together in the prescribed manner. In equation (3), AVG indicates an averaging function whereas SQRT indicates a square root function. Sets S1 and S2 may, for example, be equal to energy difference patter 56 and energy difference pattern 58, respectively.

Figure 5:
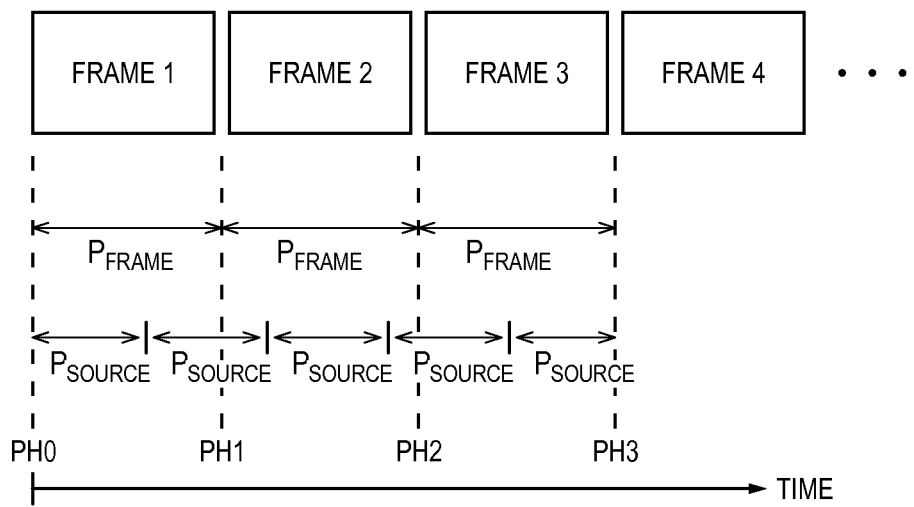
FIG. 5 is an illustrative timing diagram showing mismatched frame rates and illumination cycles in accordance with an embodiment of the present invention.

FIG. 5 is a diagram of illustrative timing periods related to automatic flicker detection. In FIG. 5, $P_{FRAME}$ indicates the frame period, (i.e., a duration of time for reading out image pixel array 42). $P_{SOURCE}$ represents the period of oscillation of the illuminating light source. Period $P_{SOURCE}$ is equal to the inverse of the flicker frequency FF (i.e., $P_{SOURCE}=1/FF$). As shown in FIG. 5, phase points PH0, PH1, PH2, and PH3 correspond to the phase point in the cycle of oscillation of the illumination light source at the start of frames 1, 2, 3, and 4, respectively. As an example, frame time $P_{FRAME}$ may be 16.666 milliseconds (ms) and a light source oscillation period $P_{SOURCE}$ may be 10 ms for a 50 Hz AC-powered light source). In this scenario in which $P_{FRAME}$ is equal to 16.666 ms and $P_{SOURCE}$ is equal to 10 ms, phase point PH1 occurs 240 degrees relative to phase point PH0 and phase point PH2 occurs 120 degrees relative to phase point PH0. In this example, phase point PH3 occurs at 0 degrees relative to phase point PH0 (i.e., phase point PH3 occurs at the same point in the oscillation cycle of the illuminating light source as phase point PH0). Phase points PH0, PH1, PH2, and PH3 may be used to determine a desirable second reference frame for automatic flicker detection.

Figure 6A:
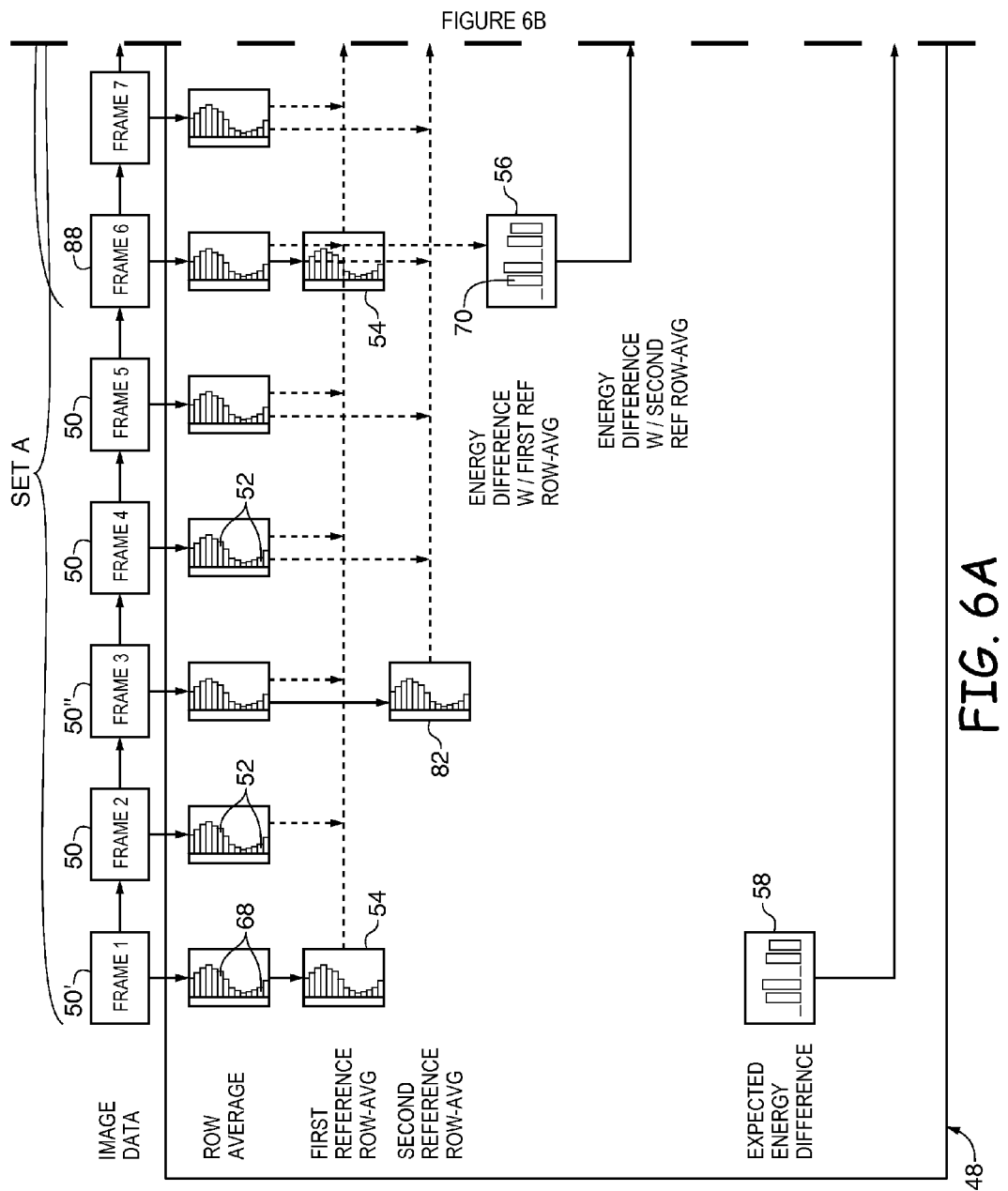
FIG. 6 is a diagram of an illustrative data collection and processing method in which data is collected at multiple phase points in an illumination cycle in accordance with an embodiment of the present invention.

FIG. 6 shows another suitable arrangement for improved flicker detection for devices 40 operating at fast frame rates. In FIG. 6, a first reference frame 50' may be stored in first image data buffer 46. Reference row-average values 68 for first reference frame 50' may be computed. Subsequent image data frames 50 may be stored in a second image data buffer 47. Row-average values 52 for subsequent image data frames 50 may be calculated. Row-average values 52 for subsequent image data frames 50 may then be combined with reference row-average values 68 to form computed energy difference pattern 56 generated using equation (2). In example FIG. 6, one of subsequent image data frames 50 may be chosen as a second reference frame 50" and stored in a third image data buffer 49.

Using second reference frame 50" and row-average values 52 of subsequent image data frames 50, a second computed energy difference pattern 84 associated with second reference frame 50" may be computed. Second energy difference pattern 84 may be averaged with first energy difference pattern 56 to obtain an average energy difference pattern 86 for a desired set of frames such as SET A of FIG. 6. First reference frame 50' may be overwritten by a new first reference frame 88 prior to the end of SET A to initiate measurement of a subsequent energy difference pattern 92.

When second energy difference pattern 84 has accumulated the same number of energy difference values 70 as first energy difference pattern 56, second reference frame 50" may be overwritten by a new second reference frame 90 for SET B. Row-average values 52 of new second reference frame 90 may be combined with subsequent row-average values to compute a new second energy difference pattern 94. As with first and second energy difference patterns 56 and 84, new first and second energy difference patterns 92 and 94 may be averaged to form new average energy difference pattern 96.

Processor 48 may then be used to compute correlation probability 98 between current average energy difference pattern 96 and previous energy difference pattern 86 to determine a correlation consistency using equation (3). For example, processor 48 may be used to calculate the correlation between average difference patterns of consecutive sets of frames such as SET A and SET B. Processor 48 of device 40 may then be used to compute a correlation probability 62 between current energy difference pattern 96 and expected energy difference pattern 58 using equation (3). Correlation probability 62 may be computed with equation (3) by associating computed correlation probability 62 with CP in equation (3) and by associating computed and expected energy differences 56 and 58 with S1 and S2 of equation (3) respectively. Flicker avoidance switch 44 may or may not be triggered depending on the values of correlation probability 62 and correlation probability 98. Device 40 may, for example, be provided with a predetermined correlation threshold of, e.g., 90%. If, for example, correlation probability 62 is less than the predetermined correlation threshold, flicker avoidance switch is not triggered. If, for example, correlation probability 62 is greater than the predetermined correlation threshold and correlation probability 98 is greater than the correlation threshold of, e.g., 90% flicker avoidance switch 44 is triggered. If, as another example, correlation probability 62 is greater than 90% and correlation probability 98 is less than a correlation threshold of, e.g., 90%, then measurement of correlation probability 62 may be contaminated and flicker avoidance switch 44 is not triggered. In this example, correlation probability 62 may be re-determined using frame set B and a subsequent frame set.

The example of FIG. 6 shows that second reference frame 50" is stored two frames after first reference frame 50' and 88 by two frames each. The choice of a two frame lag between the first and second reference frames is merely illustrative and other choices may be made. In one preferred example, second reference frames 50" and 90 may be chosen to be as close as possible to 90 degrees in phase relative to the start of frames 50' and 88. The choice of a second reference frame as being close to 90 degrees in phase from the first reference frame is intended to minimize the effect of the real-world scene as a source of noise in measuring flicker frequency FF.

Using energy difference pattern 56 as an example, energy difference values 70 are determined from row-averaged values 52. A pixel-set energy difference PSED may be estimated for each pixel set 24 using the following equation:

$$PSED=\text{Scene(Pixel Set)}*\text{Amplitude(phase)}*\sin(\text{Pixel Set,phase}). \quad (4)$$

In equation (4), Scene(Pixel Set) represents the average signal in a pixel set due to the real-world scene in an image frame. In equation (4), phase indicates a chosen phase point, such as phase points PH0-PH3 of FIG. 5. In the approximation described by equation (4), the signal due to the oscillating intensity of the illuminating light source is a multiplication of an amplitude (i.e., an intensity of the illuminating light source), which depends only on phase, and a sine function which is a function of both the phase and the pixel set. A pixel-set energy difference PSED2 associated with a second reference frame that is chosen to be 90 degrees in phase relative to the first reference frame will then have values given by an equation similar to equation (4), with the sine function replaced by a cosine function, i.e.:

$$PSED2=\text{Scene(Pixel Set)}*\text{Amplitude(phase)}*\cos(\text{Pixel Set,phase}). \quad (5)$$

Total energy difference values 70 may be determined from pixel-set energy difference values PSED and PSED2 using equations (2). Energy difference patterns 56 and 84 may be a collection of energy difference values 70. Energy difference patterns 56 and 84 may then be combined to form average energy difference pattern 86 by averaging each energy difference value 70 of energy difference patterns 56 and 84 according to the following equation:

$$\begin{aligned}\text{Average Energy Difference Value} &= (ED_1+ED_2)/2 \quad (6)\\ &= \text{Amplitude}^2(\text{phase})*\\ &\quad \text{SUM}(\text{Scene}^2(\text{Pixel Set}))/2,\end{aligned}$$

Where $ED_1$ and $ED_2$ correspond to energy difference values 70 of energy difference patterns 56 and 84, respectively.

Equation (6) is approximately true when the chosen phase is close to 90 degree. Equation (6) results in desirable average energy difference values in which the real-world scene contents become only a constant multiplier to each energy difference value in averaged energy difference patterns 86 (i.e., the real-world scene has no effect on the difference between computed energy difference patterns 56 and 84 if the chosen phase difference is 90 degrees).

In the example in which image data frames 50 are separated in time by a frame time $P_{FRAME}$ of 16.666 ms and the illuminating light source oscillates with an oscillation time $P_{SOURCE}$ of 10 ms, second reference frames 50" and 90 of FIG. 6 would each be separated from first reference frames 50' and 88 by a phase of 120 degrees. The exemplary value of a phase of 120 degrees may be considered to be close to the desired 90 degrees phase difference and is merely illustrative. Other suitable phase differences close to 90 degrees may be used.

Figure 7:
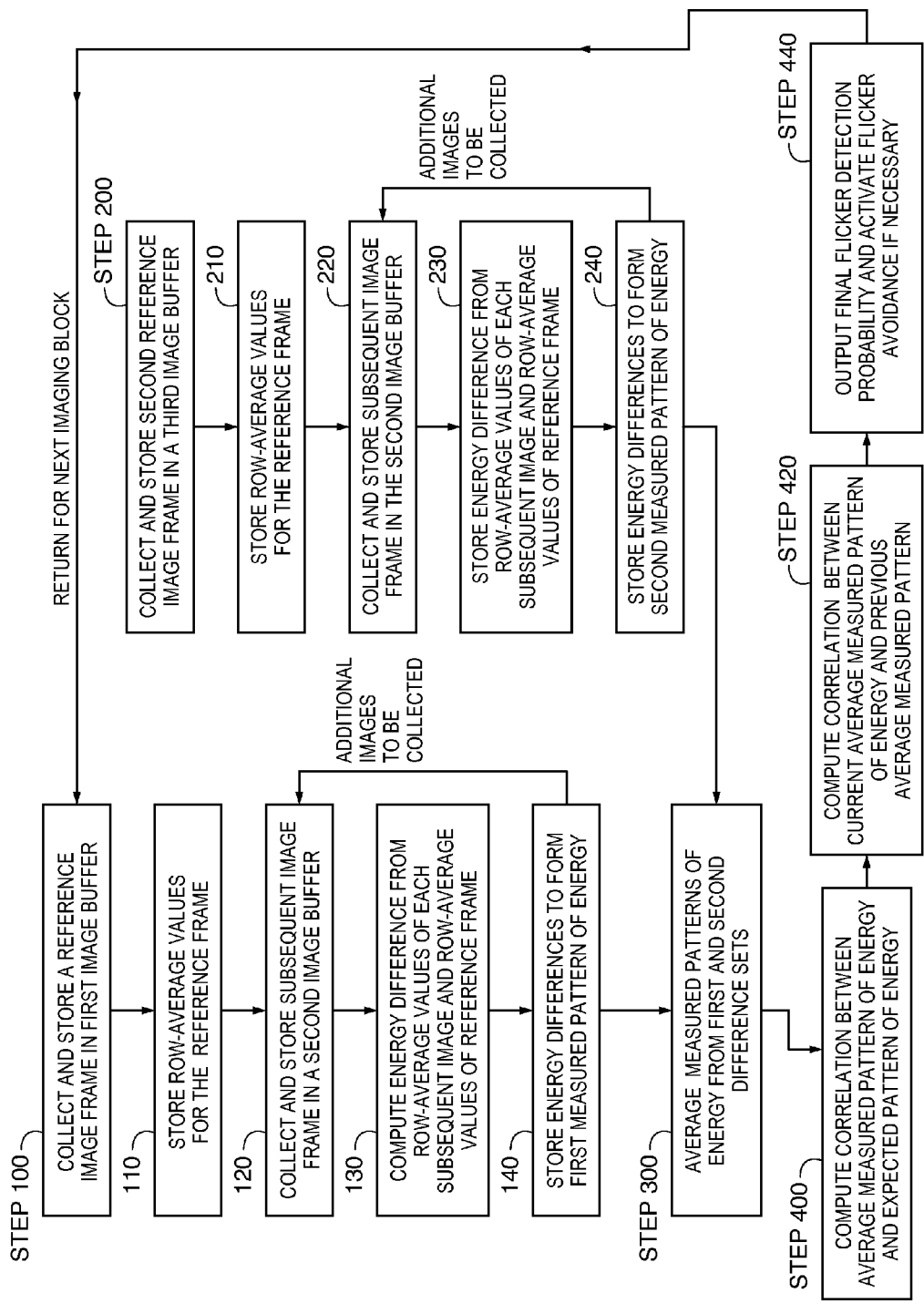
FIG. 7 is a flow chart of illustrative steps involved in collecting and processing data using a rolling scheme and in detecting flicker in accordance with an embodiment of the present invention.

FIG. 7 is a flow chart illustrative of the steps involved in collecting and processing image data for flicker detection in accordance with an embodiment of the present invention. At step 100 a first reference frame may be collected and stored in a first image data buffer. At step 110 reference row-average values for each pixel-set in the first reference frame may be computed and stored. At step 120, a subsequent image data frame may be collected and stored in a second image buffer. Using the first reference row-average values and row-average values computed from the subsequent image data frame, an energy difference value may be computed (step 130). The computed energy difference value is stored as the first entry in the measured (or computed) pattern of energy.

As shown in FIG. 7, steps 100, 110, 120, 130, and 140 may be repeated with further subsequent image data frames to form the full measured pattern of energy. In parallel with the collection of one of the subsequent image data frames at step 120, a second reference image data frame may be collected and stored in a third image data buffer as indicated (step 200). At step 210, the row-average values for pixel-sets in the second reference image data frame may be computed and stored. At step 220, a subsequent image data frame may be collected and stored in the second image data buffer. The image data frame collected and stored at step 220 may be the same as the subsequent image data frame collected and stored at step 120. At step 230, an energy difference value may be computed using the second reference row-average values and row-average values computed from the subsequent image data frame. Energy differences may be computed for row-averaged values from a single subsequent image data frame with respect to reference row-average values from each of the first and second reference frames. At step 240, energy difference values computed using the second reference frame and subsequent image data frame are stored to form a second pattern of energy.

At step 300, the first and second measured (or computed) patterns of energy may be averaged to form an average pattern of energy. At step 400, the correlation probability between the average measured pattern of energy and the expected pattern of energy is computed as described in equation (3). At step 420, the correlation probability between the current average measured pattern of energy and the average measured pattern of energy from the previous imaging block is computed as described in equation (3). At step 440, the correlation probabilities from steps 400 and 420 may be combined to determine a final probability of flicker detection and activate flicker avoidance procedures, if necessary. Flicker avoidance may be activated if the probability of flicker detection is higher than a predetermined correlation threshold. Flicker avoidance procedures may include altering the exposure time of each pixel to be a multiple of the detected flicker frequency and may include other changes to the imaging procedure that compensate for the changed integration (or exposure) time.

Various embodiments have been described using electronic devices such as portable electronic devices with image pixel arrays that use a rolling shutter scheme and fast frame rate for automatic flicker detection using more than two image data frames. Image data may be combined using the equations and methods described to determine a flicker detection probability in devices operating at frame rates that resulting in captured image frames containing less than two cycles of the illuminating light source. Further embodiments combine multiple sets of more than two image data frames, offset in phase by approximately 90 degrees in order to minimize the effects of scene contents in the combination of image data used to determine a flicker detection probability. In one preferred embodiment, multiple sets of multiple images are combined to better determine the flicker detection probability.

The foregoing is merely illustrative of the principles of this invention and various modifications can be made by those skilled in the art without departing from the scope and spirit of the invention.

What is claimed is:

1. A method of detecting flicker with an electronic imaging device, wherein the electronic imaging device comprises an image pixel array, first and second image data buffers, and a processor, the method comprising:
   capturing first, second and third images with the image pixel array;
   storing the first image in the first image buffer;
   storing the second image in the second image buffer;
   with the processor, obtaining a first energy difference value from the first and second images;
   storing the third image in the second image buffer by overwriting the second image in the second image buffer with the third image; and
   with the processor, obtaining a second energy difference value from the first and third images, wherein obtaining the first energy difference value from the first and second images comprises:
      with the processor, obtaining a set of reference row-average values based on the first image;
      with the processor, obtaining a first set of additional row-average values based on the second image; and
      with the processor, obtaining the first energy difference value based on the first set of reference row-average values and the first set of additional row-average values.

2. The method defined in claim 1, wherein obtaining the second energy difference value from the first and third images comprises:
   with the processor, obtaining a second set of additional row-average values based on the second image; and
   with the processor, obtaining the second energy difference value based on the second set of additional reference row-average values and the second set of subsequent row-average values.

3. The method defined in claim 1, further comprising:
   with the processor, combining the first and second energy difference values to generate a computed energy difference pattern; and
   with the processor, comparing the computed energy difference pattern with an expected energy difference pattern to obtain a flicker-detection probability.

4. The method defined in claim 3 wherein the electronic imaging device further comprises a flicker avoidance switch, the method further comprising:

in response to determining that the flicker-detection probability is greater than a predetermined threshold, initiating flicker avoidance operations with the flicker avoidance switch.

5. A method of detecting flicker with an electronic imaging device wherein the electronic imaging device comprises an image pixel array containing rows of image pixels, first, second, and third image data buffers, and a processor, the method comprising:

capturing first, second, and third images with the image pixel array;
storing the first image in the first image buffer;
storing the second image in the second image buffer;
with the processor, obtaining a first energy difference value from the first and second images;
storing the third image in the second image buffer by overwriting the second image in the second image buffer with the third image;
with the processor, obtaining a second energy difference value from the first and third images;
storing the third image in the third image buffer;
with the image pixel array, capturing a fourth image;
storing the fourth image in the second image buffer by overwriting the third image in the second image buffer with the fourth image; and
with the processor, obtaining a third energy difference value from the third and fourth images.

6. The method defined in claim 5, further comprising:
with the image pixel array, capturing a fifth image;
storing the fifth image in the second image buffer by overwriting the fourth image in the second image buffer with the fifth image; and
with the processor, obtaining a fourth energy difference value from the third and fifth images.

7. The method defined in claim 6, further comprising:
with the processor, generating a first energy difference pattern by combining the first and second energy difference values; and
with the processor, generating a second energy difference pattern by combining the third and fourth energy difference.

8. The method defined in claim 7, further comprising:
with the processor, combining the first and second energy difference patterns to form an average energy difference pattern.

9. The method defined in claim 8, further comprising:
with the image pixel array, capturing a plurality of additional images;
with the processor, obtaining a first plurality of additional energy difference values based on the first image stored in the first image buffer and at least some of the additional images; and
with the processor, obtaining a second plurality of additional energy difference values based on the third image stored in the third image buffer and at least some of the additional images.

10. The method defined in claim 9, wherein forming the first energy difference pattern by combining the first and second energy difference values further comprises:
with the processor, forming the first energy difference pattern by combining the first and second energy difference values with the first plurality of additional energy difference values.

11. The method defined in claim 10, wherein forming the second energy difference pattern by combining the third and fourth energy difference values further comprises:
with the processor, forming the second energy difference pattern by combining the third and fourth energy difference values with the second plurality of additional energy difference values.

12. The method defined in claim 11 wherein the first, second, third, fourth, and fifth images and the plurality of additional images collectively form a first set of images, the method further comprising:
capturing a second set of images, wherein the second set of images includes at least some of the first set of images; and
with the processor, obtaining a second average energy difference pattern based on the second set of images.

13. The method defined in claim 12, wherein the electronic imaging device further comprises a flicker avoidance switch, the method further comprising:
with the processor, computing a correlation probability between the first average energy difference pattern and the second average energy difference pattern;
with the processor, computing a flicker-detection probability between the second average energy difference pattern and an expected energy difference pattern; and
in response to determining that the flicker-detection probability is greater than a first predetermined threshold, and the correlation probability is greater than a second predetermined threshold, initiating flicker avoidance operations with the flicker avoidance switch.

14. The method defined in claim 5, wherein the first, second, and third images represent images of a scene illuminated using a light source, wherein the light source has a flicker cycle, and wherein capturing the first, second, and third images with the image pixel array comprises:
capturing the first, second, and third images with the image pixel array by capturing the third image a time period after capturing the first image, wherein the first time period corresponds to a predetermined phase point in the flicker cycle.

15. A method of detecting flicker with an electronic imaging device wherein the electronic imaging device comprises an image pixel array, and a processor, the method comprising:
with the image pixel array, capturing a first plurality of images;
with the processor, computing a first pattern of energy difference values based on the first plurality of images; and
with the processor, comparing the computed first pattern of energy difference values with an expected pattern of energy difference values to obtain a flicker-detection probability.

16. The method defined in claim 15, further comprising:
with the image pixel array, capturing a second plurality of images; and
with the processor, computing a second pattern of energy difference values based on the second plurality of images.

17. The method defined in claim 16, wherein the first and second pluralities of images represent images of a scene illuminated using a light source, wherein the light source has a flicker cycle, wherein capturing first plurality of images occurs at a first phase point in the flicker cycle, and wherein capturing the second plurality of images occurs at a second phase point in the flicker cycle that is different from the first phase point.

18. The method defined in claim 16, wherein comparing the first pattern of energy values with the expected pattern of energy difference values comprises:
- averaging the first and second patterns of energy difference values to generate an average pattern of energy difference values; and
- computing a correlation probability between the average pattern of energy difference values and the expected pattern of energy difference values.

19. The method defined in claim 18, wherein the electronic imaging device further comprises a flicker avoidance switch, the method further comprising:
- with the image pixel array capturing a third plurality of images;
- with the processor, computing a third pattern of energy differences based on the third plurality of images;
- with the processor, comparing the first and third pattern of energy differences by computing a correlation probability; and
- in response to determining that the flicker-detection probability is greater than a first predetermined threshold, and the correlation probability is greater than a second predetermined threshold, initiating flicker avoidance operations with the flicker avoidance switch.

20. The method defined in claim 15, wherein comparing the computed first pattern of energy difference values with the expected pattern of energy difference values to obtain a flicker-detection probability comprises:
- comparing the computed first pattern of energy difference values with the expected pattern of energy difference values to obtain a correlation probability.

21. The method defined in claim 15, wherein the electronic imaging device further comprises a flicker avoidance switch, the method further comprising:
- with the processor, comparing the flicker-detection probability to a threshold; and
- in response to determining that the flicker-detection probability is greater than the threshold, initiating flicker avoidance operations using the flicker avoidance switch.

* * * * *